April 25, 1933.   M. J. PHALEN   1,906,013
PLANT SPRAYING MACHINE
Filed July 23, 1930   3 Sheets-Sheet 1
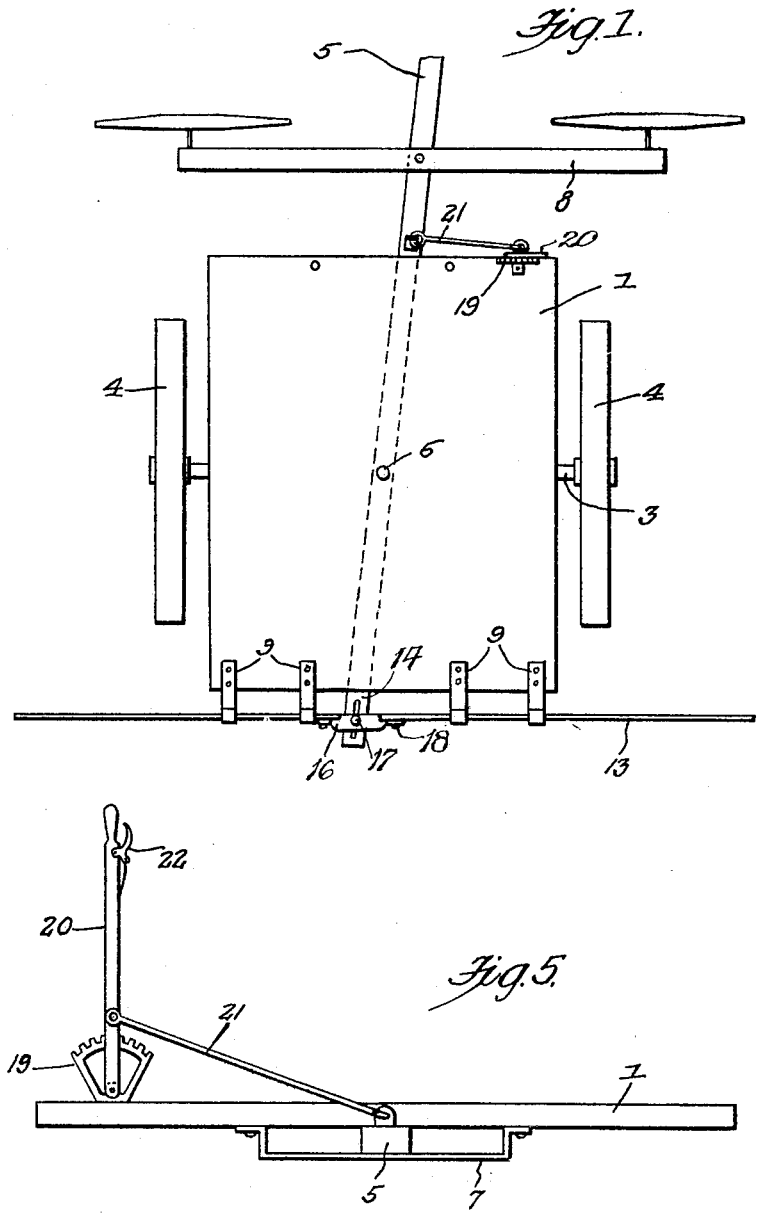
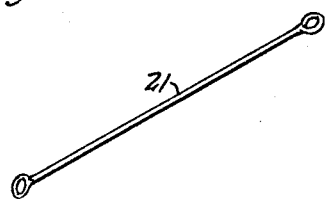
Inventor
Maurice J. Phalen,
By Clarence A. O'Brien
Attorney

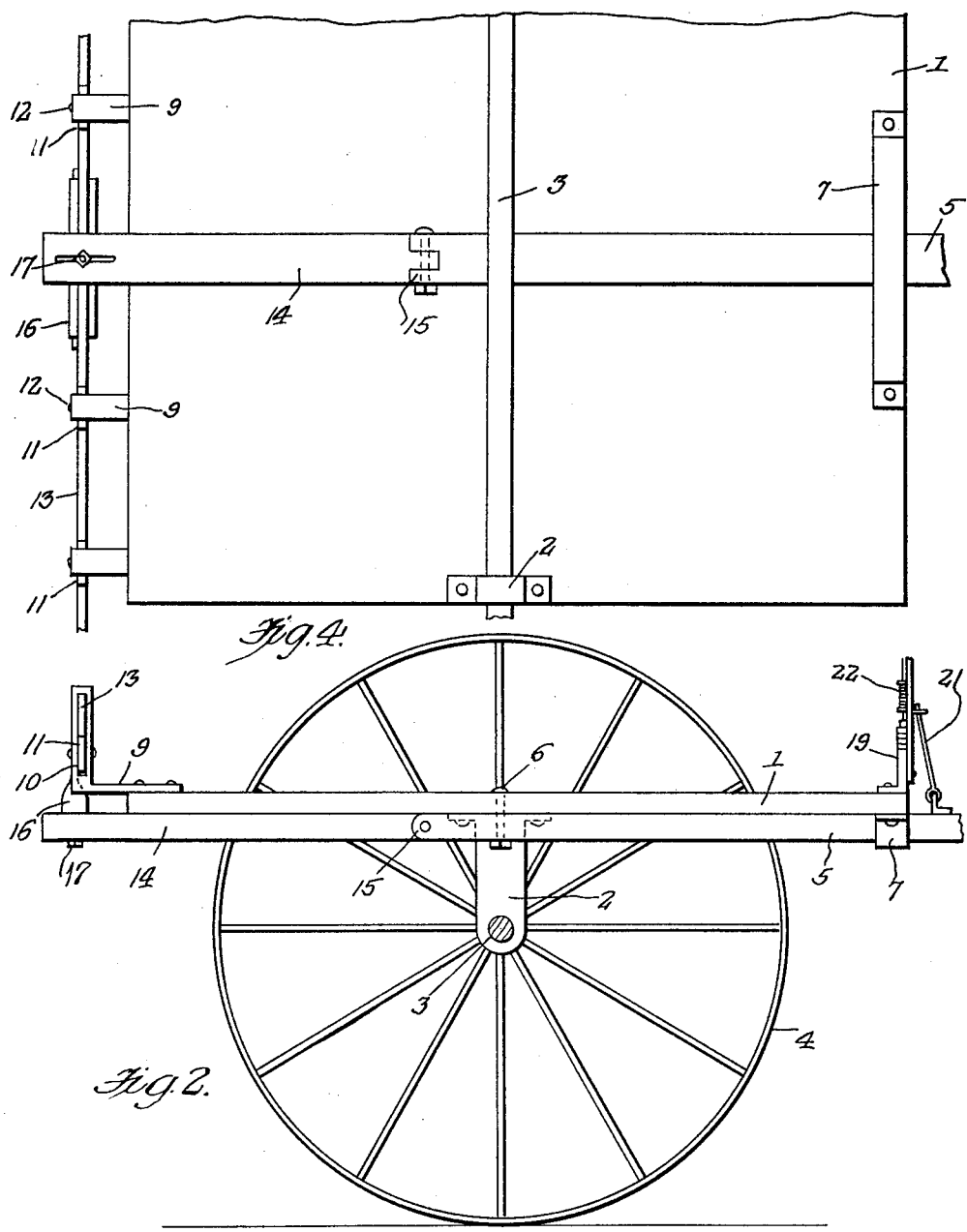

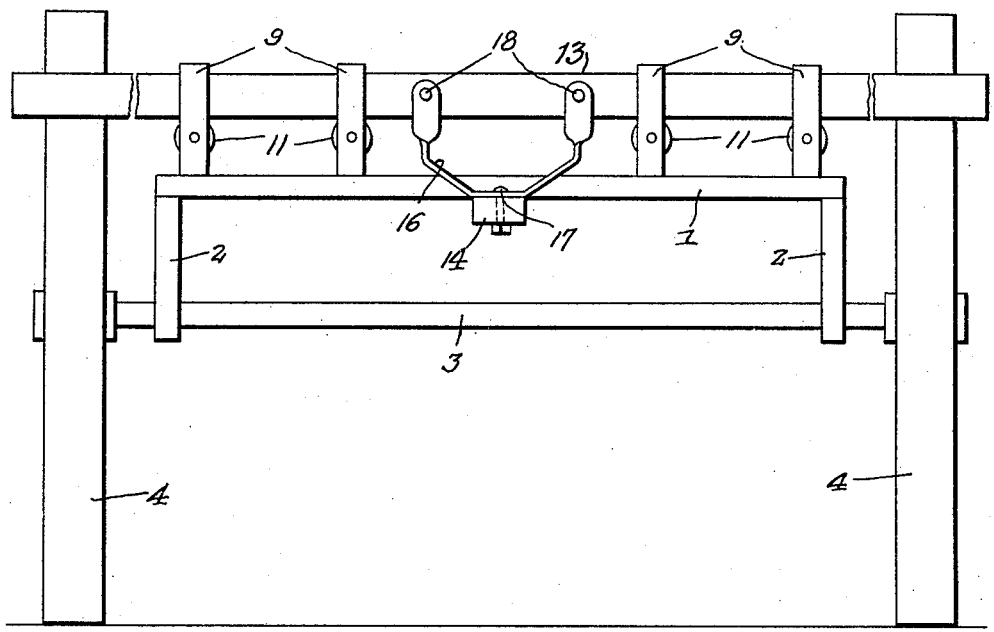
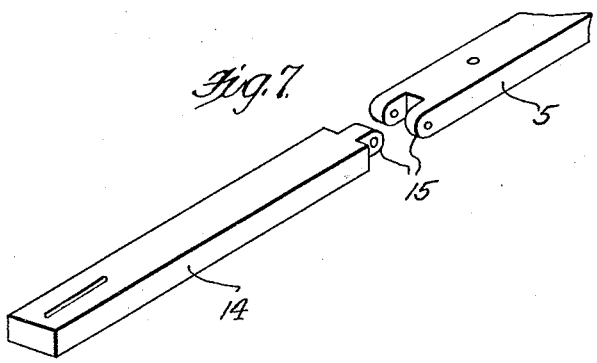
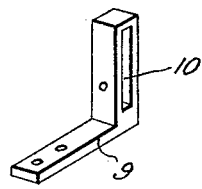
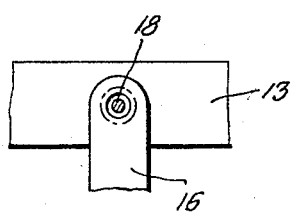

Patented Apr. 25, 1933

1,906,013

UNITED STATES PATENT OFFICE

MAURICE J. PHALEN, OF MARATHON, NEW YORK

PLANT SPRAYING MACHINE

Application filed July 23, 1930. Serial No. 470,041.

This invention relates generally to agricultural implements or machines and more particularly to new and useful improvements in plan spraying or dusting machines.

An important object of the invention is to provide, in a manner as hereinafter set forth, a machine of the aforementioned character, embodying a manually adjustable draft tongue, which is adapted to be adjusted for when the machine is used on a hill side so that the plants may be effectively treated and trampling thereon by the draft animals avoided, said animals, by reason of this invention, being enabled to travel between the rows of plants when working on hillsides instead of being forced toward or over the plants in order to maintain the machine in proper position relative to the rows.

Another important object of the invention is to provide a machine of the character described, embodying a laterally shiftable spray nozzle supporting bar, which is operatively connected to the draft tongue, whereby to be adjusted by the shifting of the draft tongue for maintaining said nozzle in proper position with respect to the rows of plants and compensating for the angularity of the machine when travelling across a hillside, thus materially reducing waste of the material being sprayed, and assuring the proper treatment of the plants under such conditions.

Other objects of the invention are to provide a plant spraying machine of the character set forth, which will be simple in construction, strong, durable, highly efficient in its use, and may be manufactured at low cost.

All of the foregoing and still further objects and advantages of the invention may become apparent from a study of the following specification, taken in connection with the accompanying drawings, wherein like characters of reference designate corresponding parts throughout the several views, and wherein:

Figure 1 is a top plan view of a machine constructed in accordance with this invention.

Figure 2 is a view in side elevation thereof.

Figure 3 is a view in rear end elevation of the machine.

Figure 4 is a fragmentary view, in bottom plan.

Figure 5 is a view in front elevation, showing the lever for manually adjusting the draft tongue.

Figure 6 is a detail view in perspective showing the links which connect the lever to the draft tongue.

Figure 7 is a detail view in perspective showing the hinged tongue extension.

Figure 8 is a detail view in perspective, showing one of the brackets for adjustably supporting the nozzle supporting bar or beam.

Figure 9 is a detail view in vertical section through one of the brackets, showing the manner in which the nozzle supporting bar is disposed therein.

Figure 10 is a detail view, showing the means of connecting one of the arms to the nozzle supporting bar by which said bar is connected to the tongue extension.

Referring to the drawings in detail, it will be seen that the reference numeral 1 designates a horizontally disposed platform of appropriate size, and shape, from which depend the bearings 2, through which the axle 3 extends and upon which axle the wheels 4 are mounted. As will be seen the bearings 2 depend from the intermediate portions of the platform 1, adjacent the longitudinal sides thereof.

A draft tongue 5 extends beneath the platform 1 and is pivotally connected thereto as at 6. The tongue 5 is swingable in a transversely disposed guide bracket 7, which depends from the lower side of the platform 1, at the front of said platform. A tree 8 is mounted on the tongue 5 in the usual manner, to connect the draft animals to the machine.

A series of angular brackets 9 are rigidly mounted in spaced relation across the rear end portion of the platform 1 and project rearwardly from said platform as best seen in Figures 1 and 2 of the drawings. Each of the brackets 9 includes a horizontally disposed arm which is rigidly secured to the platform 1, and a comparatively fixed vertical arm, having formed therein a slot 10. A roller 11 is mounted for rotation in the lower portion of each of the slots 10, through the medium of the pins 12 (see Figure 9). An elongated nozzle supporting bar 13 extends slidably through the slots in the brackets and rests on the rollers 11 therein. It will be understood, of course, that the platform 1 is for the purpose of supporting a suitable reservoir, in which the material to be sprayed is contained, and the nozzles for spraying said material are to be clamped in the usual manner on the bar 13.

A vertically swingable extension 14 is hingedly connected as at 15 to the rear end of the tongue 5 and said extension projects rearwardly beyond the platform 1 and beneath the bar 13. A substantially U-shaped bracket 16 is swivelly secured by a pin and slot connection, as at 17, on the upper side of the rear end portion of the extension 14, the legs of the bracket are loosely connected to the nozzle supporting bar 13, as at 18, so as to afford considerable play between these parts and permit gravitational resting of the bar 13 on the rollers.

An upstanding toothed segment 19 is mounted on the platform 1, adjacent the forward edge of the said platform and said segment is disposed transversely with respect to said platform. A lever 20 is mounted for swinging movement on the segment 19 and a link 21 has one end pivotally connected with an intermediate portion of the lever 20 and its opposite end pivotally connected to the tongue 5, in a manner to swing said tongue laterally upon actuation of the lever. A suitable pawl 22 is carried by the lever 20 and engageable with the toothed segment 19 for releasably securing the lever 20 in adjusted position.

When the machine is in operation on a hillside, the tongue 5 may be swung to either side through the medium of the lever 20 as before explained to compensate for the tendency of the machine to slide down the hill as it is being drawn along and to take an angular direction to its course. When the tongue 5 is swung in one direction, the nozzle supporting bar 13 will be moved through the medium of the connections described so as to properly place the spray nozzles as required by the angular position of the machine, in the opposite direction. Swinging movement of the extension 14 is permitted by reason of the loose connections between the legs of the U-shaped bracket 16 and the bar 13, which is best seen in Figure 10 of the drawings, wherein it will be noted that the pins which connect the legs to the bar 13 are materially smaller than the openings provided therefor in the said bracket 16.

It is believed that the many advantages of a machine constructed in accordance with this invention will be readily understood, and although the preferred embodiment of the invention is illustrated and described, it is to be understood that changes in the details of construction will be had, which will fall within the scope of the invention as claimed.

What is claimed is:

1. A plant spraying machine comprising a wheeled platform, a draft tongue connected for swinging movement to the platform, a spray nozzle supporting bar mounted for transverse sliding movement on the platform, means operatively connecting the bar to the tongue for actuation by said tongue and means for releasably securing the platform against movement relative to the tongue.

2. A plant spraying machine comprising a wheeled platform, a draft tongue connected for swinging movement to the platform, a series of brackets mounted on the platform having transversely aligned slots therein, a bar disposed for sliding movement through the slots, said bar adapted to support a plurality of spray nozzles, means connecting the bar to the tongue for actuation by said tongue, and means for releasably securing the platform against movement relative to the tongue.

3. A plant spraying machine comprising a wheeled platform, a draft tongue connected for swinging movement to the platform, a series of brackets mounted in spaced relation transversely across the rear end portion of the platform and including upstanding slotted arms, rollers mounted for rotation in the slots, a spray nozzle supporting bar extending slidably through the slots and engageable for rest on the rollers, means operatively connecting the bar to the tongue for actuation by said tongue, and means for releasably securing the platform against movement relative to the tongue.

4. A plant spraying machine comprising a wheeled platform, a draft tongue connected for swinging movement to the platform, a series of brackets mounted in spaced relation transversely across the rear end portion of the platform and including upstanding slotted arms, rollers mounted for rotation in the slots, a spray nozzle supporting bar extending slidably through the slots and engageable for rest on the rollers, means operatively connecting the bar to the tongue for actuation by said tongue, said means comprising an extension hingedly connected to the rear end of the tongue, and a substantially U-shaped bracket loosely carried by the said bar and swivelly connected with the extension, and means for releasably securing the platform against movement relative to the tongue.

5. A plant spraying machine comprising a wheeled platform, a draft tongue connected for transverse swinging movement to the platform, means mounted on the platform for manually swinging the tongue and releasably securing the tongue in adjusted position against swinging movement, a spray nozzle supporting bar mounted for transverse sliding movement on the platform, an extension hingedly connected to the rear end of the tongue, and means operatively connecting the bar to the free end portions of the extension in a manner to shift the bar transversely upon swinging movement of the tongue.

6. A plant spraying machine comprising a wheeled platform, a draft tongue extending beneath the platform and connected for transverse swinging movement thereto, a manually operable lever pivotally mounted on the forward end portion of the platform and connected to the tongue for swinging said tongue, a series of brackets mounted in transverse spaced relation across the rear end portion of the platform and projecting rearwardly therefrom, a nozzle supporting bar slidably mounted on the brackets, an extension hingedly connected at one end to the rear end of the tongue, and a substantially U-shaped bracket swivelly connected to the free end of the extension and engaging the nozzle supporting bar.

In testimony whereof I affix my signature.

MAURICE J. PHALEN.